US008417627B2

(12) United States Patent
Cerise et al.

(10) Patent No.: US 8,417,627 B2
(45) Date of Patent: Apr. 9, 2013

(54) METHODS AND SYSTEMS FOR ACTIVELY OPTIMIZING A CREDIT SCORE AND MANAGING/REDUCING DEBT

(75) Inventors: Nicholas Cerise, Denver, CO (US);
Michael W. Rogers, Berkeley, CA (US);
William R. Grant, Danville, CA (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 13/323,344

(22) Filed: Dec. 12, 2011
(Under 37 CFR 1.47)

(65) Prior Publication Data
US 2012/0317014 A1 Dec. 13, 2012

Related U.S. Application Data

(63) Continuation of application No. 12/178,314, filed on Jul. 23, 2008, now Pat. No. 8,078,527, which is a continuation-in-part of application No. 10/336,671, filed on Jan. 2, 2003, now Pat. No. 7,849,009, which is a continuation-in-part of application No. 10/168,871, filed as application No. PCT/US00/33750 on Dec. 13, 2000, now abandoned.

(60) Provisional application No. 60/173,691, filed on Dec. 29, 1999.

(51) Int. Cl.
*G06Q 40/00* (2012.01)
(52) U.S. Cl.
USPC .................. 705/38; 705/40; 705/1.1; 705/35; 705/34
(58) Field of Classification Search .................... 705/1.1, 705/38, 40, 35, 39, 36 R, 34, 30, 45; 710/33; 235/379
See application file for complete search history.

(56) References Cited

U.S. PATENT DOCUMENTS

| 4,270,042 A | 5/1981 | Case |
| 4,727,243 A | 2/1988 | Savar |
| 5,214,579 A | 5/1993 | Wolfberg et al. |
| 5,557,518 A | 9/1996 | Rosen |

(Continued)

FOREIGN PATENT DOCUMENTS
WO 01/50304 A2 7/2001

OTHER PUBLICATIONS
"How to Bail Out of Debt"—By: Margaret Mannix Copyright 1993, The U.S. News & World Report, L.P.*

(Continued)

*Primary Examiner* — John H Holly
(74) *Attorney, Agent, or Firm* — Kilpatrick Townsend & Stockton, LLP

(57) ABSTRACT

The invention provides various systems and methods for actively optimizing a credit score and reducing debt. The method includes receiving a credit report including credit accounts, balances, interest rates, and rate types for the credit accounts. The method further receives bank account and payroll information, as well as fixed and variable expense information. The method then generates a financial report based on the received information. Based on the financial report, the method calculates a payment amount, and determines available unassigned income. An allocation of the available income for debt reduction and credit score optimization is received, and the method dynamically allocates the funds to pay the credit accounts, the fixed expenses, and variable expenses such that the customer's debt is reduced and the customer's credit score is improved.

20 Claims, 6 Drawing Sheets

U.S. PATENT DOCUMENTS

| | | | |
|---|---|---|---|
| 5,649,117 | A | 7/1997 | Landry |
| 5,684,965 | A | 11/1997 | Pickering |
| 5,689,649 | A | 11/1997 | Altman et al. |
| 5,699,528 | A | 12/1997 | Hogan |
| 5,875,435 | A | 2/1999 | Brown |
| 5,920,848 | A | 7/1999 | Schutzer et al. |
| 5,946,669 | A | 8/1999 | Polk |
| 5,987,436 | A | 11/1999 | Halbrook |
| 6,006,207 | A | 12/1999 | Mumick et al. |
| 6,032,133 | A | 2/2000 | Hilt et al. |
| 6,041,315 | A | 3/2000 | Pollin |
| 6,088,686 | A | 7/2000 | Walker et al. |
| 6,185,543 | B1 | 2/2001 | Galperin et al. |
| 6,223,168 | B1 | 4/2001 | McGurl et al. |
| 6,253,203 | B1 | 6/2001 | O'Flaherty et al. |
| 6,269,347 | B1 | 7/2001 | Berger |
| 6,304,860 | B1 | 10/2001 | Martin, Jr. et al. |
| 6,401,079 | B1 | 6/2002 | Kahn et al. |
| 6,430,542 | B1 | 8/2002 | Moran |
| 6,493,680 | B2 | 12/2002 | Logan et al. |
| 6,606,606 | B2 | 8/2003 | Starr |
| 6,850,996 | B2 | 2/2005 | Wagner |
| 6,904,412 | B1 | 6/2005 | Broadbent et al. |
| 7,089,208 | B1 | 8/2006 | Levchin et al. |
| 7,849,009 | B2 | 12/2010 | Compiano et al. |
| 8,078,527 | B2 | 12/2011 | Cerise et al. |
| 2001/0013017 | A1 | 8/2001 | Berger |
| 2002/0038289 | A1 | 3/2002 | Lawlor et al. |
| 2002/0095651 | A1 | 7/2002 | Kumar et al. |
| 2002/0123949 | A1 | 9/2002 | VanLeeuwen |
| 2002/0156733 | A1 | 10/2002 | Shimada et al. |
| 2003/0074311 | A1 | 4/2003 | Saylors et al. |
| 2003/0208445 | A1 | 11/2003 | Compiano |
| 2004/0078318 | A1 | 4/2004 | Miller |
| 2004/0230526 | A1 | 11/2004 | Praisner |
| 2005/0177501 | A1 | 8/2005 | Thomas |
| 2006/0271465 | A1 | 11/2006 | McNamar et al. |
| 2008/0021802 | A1 | 1/2008 | Pendleton |
| 2010/0325036 | A1 | 12/2010 | Thomas |

OTHER PUBLICATIONS

Guttentag, J., "Your Mortgage; There's No Magic Needed to Repay Home Loan Early," Los Angeles Times, Jul. 5, 1998, [retrieved on Feb. 4, 2008], 2 pages. Retrieved from: http://w3.nexis.com.

International Search Report and Written Opinion of PCT/US2009/045298 mailed on Jul. 21, 2009, 9 pages.

Joinson, C., "Pay attention to pay cycles," HR Magazine, Nov. 1998, [retrieved on Jul. 27, 2007], vol. 43, Iss. 12, 4 pages. Retrieved from: http://proquest.umi.com.

Lazarony, L., "Paying off high credit card debt—pick an approach and do it," Bankrate.com, Sep. 21, 1999, [retrieved on Feb. 4, 2008], 3 pages. Retrieved from: http://web.archive.org/web/19990922005549/http://www.bankrate.com/brm/news/cc/19980713.asp.

Mannix, M., "How to Bail Out Of Debt," U.S. News & World Report, Feb. 15, 1993, vol. 114, Iss. 6, 7 pages.

Meyer, G., "Plan payments to save on interest," Kansas City Star, May 7, 1995, [retrieved on Feb. 4, 2008], 2 pages. Retrieved from: http://w3.nexis.com.

Palestrant, V., "Cutting corners; Banking," Sydney Morning Herald, Feb. 19, 1997, [retrieved on Feb. 4, 2008], 4 pages. Retrieved from: http://w3.nexis.com.

Patchett, S., "There Are Many Ways to Pay Off Credit Debt Find One That Suits You," The Post-Standard (Syracuse, NY), Oct. 21, 1996, [retrieved on Feb. 4, 2008], 2 pages. Retrieved from: http://w3.nexis.com.

* cited by examiner

US 8,417,627 B2

METHODS AND SYSTEMS FOR ACTIVELY OPTIMIZING A CREDIT SCORE AND MANAGING/REDUCING DEBT

PRIORITY CLAIM

This application is a continuation of U.S. patent application Ser. No. 12/178,314, filed on Jul. 23, 2008, entitled METHODS AND APPARATUS FOR ACTIVELY OPTIMIZING A CREDIT SCORE AND MANAGING/REDUCING DEBT, which is a continuation-in-part (CIP) of U.S. patent application Ser. No. 10/336,671, filed on Jan. 2, 2003, entitled METHODS AND APPARATUS FOR MAPPING SOURCES AND USES OF CONSUMER FUNDS, which is a CIP of U.S. application Ser. No. 10/168,871, filed on Nov. 13, 2002, entitled METHODS AND APPARATUS FOR MAPPING SOURCES AND USES OF CONSUMER FUNDS, which is based on International Application No. PCT/US00/33750, entitled METHODS AND APPARATUS FOR MAPPING SOURCES AND USES OF CONSUMER FUNDS, filed Dec. 13, 2000; which claims priority from U.S. Provisional Patent Application Ser. No. 60/173,691, filed Dec. 29, 1999, which are all incorporated by reference herein for any and all purposes.

FIELD OF THE INVENTION

The present invention relates, in general, to finance management, and more particularly, to managing finances in order to actively optimize a credit score and reduce debt.

BACKGROUND OF THE INVENTION

Presently, in order for consumers to optimize their credit scores they must attempt to manually determine which credit cards (and other debt) to pay down first, when to pay it down and how much to pay. In addition, even when credit cards have been paid-off, it may still be beneficial to the customer's credit score to maintain the line of credit even after it has been paid off. These and many other factors are involved in determining the best approach to increasing a customer's credit score, and customers are simply not equipped to make such determinations.

Similar to increasing a credit score, managing a customer's monthly bills to reduce debt in the most effective way possible can also be difficult. For example, in some situations it may be beneficial for a customer to pay certain bills twice a month in order to reduce the amount of interest accrued. In addition, it may be more beneficial to pay more on some bills than others. However, currently, customers must make such decisions and then manually make the payments, which can be difficult, incontinent, and often impossible for a customer to do on their own. Accordingly, improvements in the art are needed.

BRIEF SUMMARY OF THE INVENTION

The present invention provides methods for actively optimizing a credit score and reducing debt. The method includes receiving a credit report which includes credit accounts, balances, interest rates, and rate types for the credit accounts. The method further receives bank account and payroll information, as well as fixed and variable expense information. The method then generates a financial report based on the received information. Based on the financial report, the method calculates a minimum payment amount, and determines available unassigned income. An allocation of the available income for debt reduction and credit score optimization is received, and dynamically allocated to pay the credit accounts, the fixed expenses, and variable expenses such that the customer's debt is reduced and the customer's credit score is increased at the fastest possible rate.

The present invention provides for a system for actively optimizing a credit score and reducing debt. The system includes an interface configured to receive financial input from a customer, and a plurality of payees configured to transmit bills for services rendered to the customer and to receive payment for the services. The system further includes a credit institution configured to generate a credit report for the customer. The credit report includes credit accounts, balance information for the credit accounts, interest rate information for the credit accounts, and interest types for the credit accounts. The system also includes a banking institution configured to receive income funds for the customer.

The system further includes a payment center coupled with the interface, the plurality of payees, the credit institution, and the banking institution. The payment center is configured to dynamically receive the credit report for the customer from the credit institution, to receive bank account information and payroll information from the banking institution, and to receive fixed and variable expense information via the interface. The payment center includes a fund allocation engine. The fund allocation engine is configured to generate a financial report based on an aggregation of the credit report information, the bank account information, payroll information, fixed expense information, and the variable expense information.

The engine is further configured to, based at least in part on the financial report, calculate a minimum payment amount and based at least in part on the minimum payment amount, determine available income. The available income includes unassigned income to receive an allocation of the available income for debt reduction and credit score optimization. Furthermore, the engine is configured to dynamically allocate the available income to pay one or more of the credit accounts, the fixed expenses, and variable expenses, such that the customer's debt is reduced and the customer's credit score is increased at the fastest possible rate.

A further embodiment of the present invention provides a machine readable medium for actively optimizing a credit score and reducing debt. The machine readable medium includes receiving a credit report including credit accounts, balances, interest rates, and rate types for the credit accounts. The machine readable medium further receives bank account and payroll information, as well as fixed and variable expense information. The machine readable medium then generates a financial report based on the received information. Based on the financial report, the machine readable medium calculates a minimum payment amount and determines available unassigned income. An allocation of the available income for debt reduction and credit score optimization is received and dynamically allocated to pay the credit accounts, the fixed expenses, and variable expenses such that the customer's debt is reduced and the customer's credit score is increased at the fastest possible rate.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

The invention provides various systems and methods for increasing a customer's credit score and reducing debt. In one embodiment, a customer may be directed to input their current debt, monthly bills, other expenses, etc. Based on the inputted information, a credit optimization/debt reduction may engine determine the most efficient way in which the customer can increase their credit score and reduce their debt.

For example, a customer makes $4000.00 per month paid in $2000.00 increments on the $1^{st}$ and the $15^{th}$ of each month. The customer has a mortgage payment of $1000.00 at 6.75% due on the $1^{st}$ of each month, a credit card with a minimum payment of $50.00 at 9% due on the $30^{th}$ of each month, and an auto loan of $500.00 at 3% also due on the $30^{th}$ of each month. The customer has decided to allocate an additional $1000.00 to pay down existing debt.

According to one embodiment of the present invention, based on the above information, the engine would determine that the customer should pay the mortgage with the first paycheck and hold an additional $500.00. Then, $250.00 of the additional $500.00 would be applied to the auto loan on the $15^{th}$ and the other $250.00 is applied to the credit card on the $15^{th}$. Subsequently, $1000.00 is held from the paycheck on the $15^{th}$ and another $250.00 is paid to the auto loan on the $30^{th}$ and an additional $750.00 is paid on the credit card on the $30^{th}$. Thus, the customer's debt is reduced by making bi-monthly payments on both the credit card and auto loan, and the customer's credit score is increased by reducing outstanding debt. One skilled in the art would know that this is merely a simplified example and more complex calculations that would need to be made. Nonetheless, the end result of the engine's calculations is a determination of the best possible way to utilize the customer's funds to optimize the customer's credit score and reduce debt as quickly as possible.

Figure 1A:
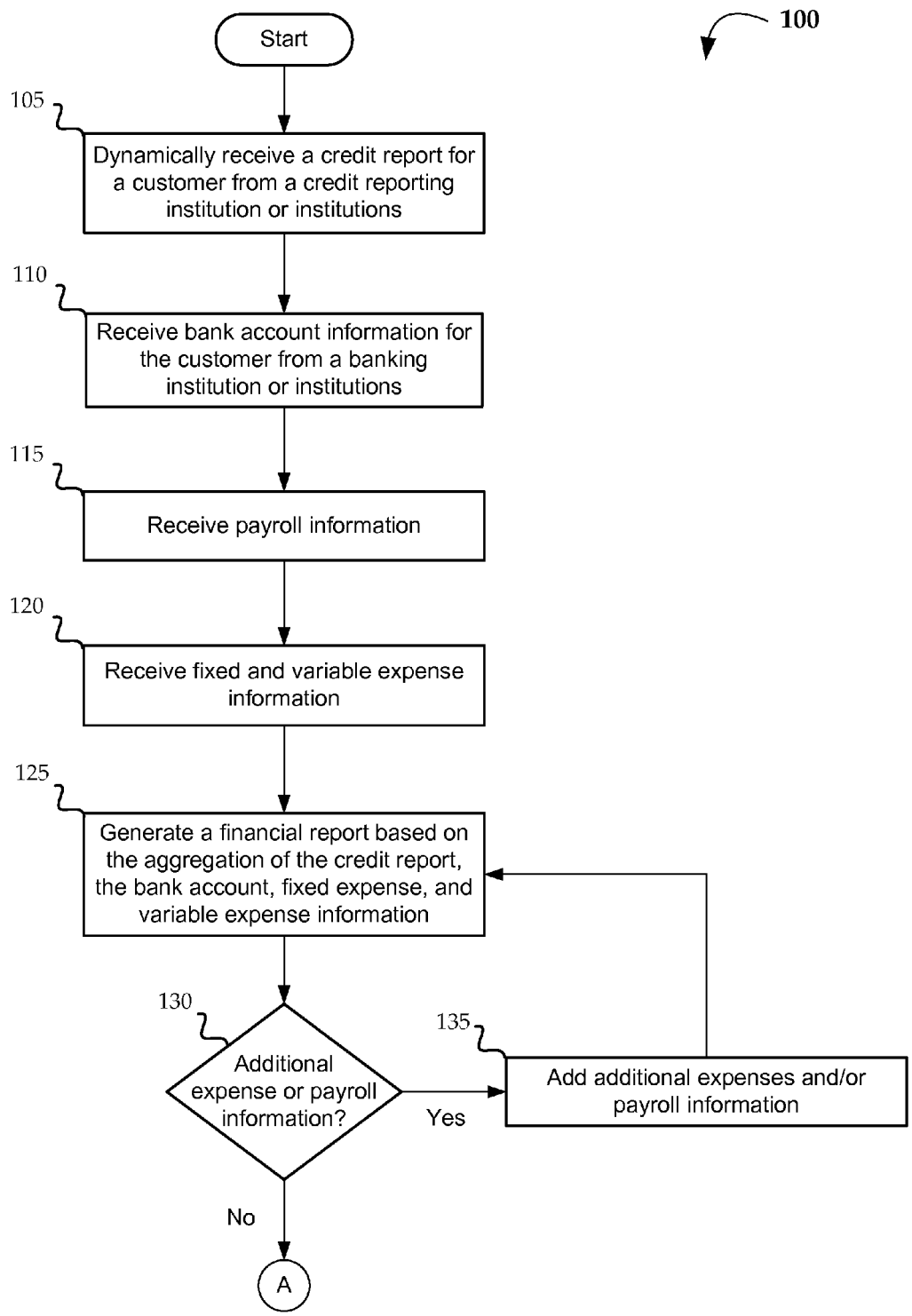
FIG. 1A is a flow diagram illustrating a method for credit optimization and debt reduction according to embodiments of the present invention.

Turning now to FIG. 1A which illustrates a method 100 for credit optimization and debt reduction according to embodiments of the present invention. Alternatively, method 100 may be used to reduce the amount of debt incurred each month if a customer does not earn enough to cover all of their current expenses. In a further embodiment, method 100 may be used to optimize the credit score of a customer as well as reduce the customer's overall debt. At process block 105, the customer's credit report may be dynamically received from a credit reporting agency. In one embodiment, the credit reporting agency may be any one of Experian™, Equifax™, TransUnion™, etc. The credit report may, for example, include the customer's open and closed credit accounts, balance information for the open credit accounts, interest rate information for the open credit accounts, interest types for the open credit accounts, and minimum payment amounts. The credit report may further include current and past addresses and other contact information for the customer, as well as current and past employment information.

At process block 110, the customer's bank account information may be received from the customer and/or a banking institution (or institutions). The bank account information may include account balances, interest rates, account numbers, and account types. At process block 115, the customer's payroll information may be received. In one embodiment, the payroll information may include frequency of payment (e.g., paid every two weeks, paid on the $1^{st}$ and the $15^{th}$ of the month, etc.), amounts of payments (e.g., an average, a salary amount, etc.), the entity originating the payment, etc.

At process block 120, the customer may choose to enter fixed and/or variable expense information. In one embodiment, the fixed expense information may include, for example, an auto loan, a mortgage, insurance, etc. The variable expenses may include, for example, an electric bill, a phone bill, a water bill, a grocery bill, etc. It would be apparent to one of ordinary skill in the art that additional expenses may be included and that some of the fixed expenses may be variable and some of the variable expenses may be fixed depending on each individual customer. Furthermore, the customer may choose to input all or only some of their expenses.

In a further embodiment, the customer may be presented with a user interface (e.g., web interface 325 from FIG. 3) to enter their expense information. In one embodiment, the interface may require a login and password to access the interface, and the customer may then be prompted to enter various personal information (name, address, birth date, social security number, etc.), and the various expense information. The customer may then be given the opportunity to login to the interface and make adjustments to the information they have provided (e.g., changes in personal information, adding or removing an expense, etc.).

At process block 125, a financial report may be generated based on the aggregation of the credit report, the fixed expense and variable expense information, payroll information, and the bank account information. In one embodiment, the financial report may include a "snapshot" of the customer's current financial situation which would be presented in such a way that would be easy for the customer to read and understand. Thus, the customer can review the report and determine if it is accurate and if additional information is needed in order for the report to be more complete.

At decision block 130, a determination is made whether the customer needs to add additional expenses and/or payroll information. For example, the customer may have forgotten to enter their cellular phone bill information or the customer may have additional income sources (e.g., rental properties, interest income, etc.). If the customer has additional information to enter, then the addition information may be entered in, for example, the interface and added to the financial report (process block 135). Otherwise method 100 continues to point A.

Figure 1B:
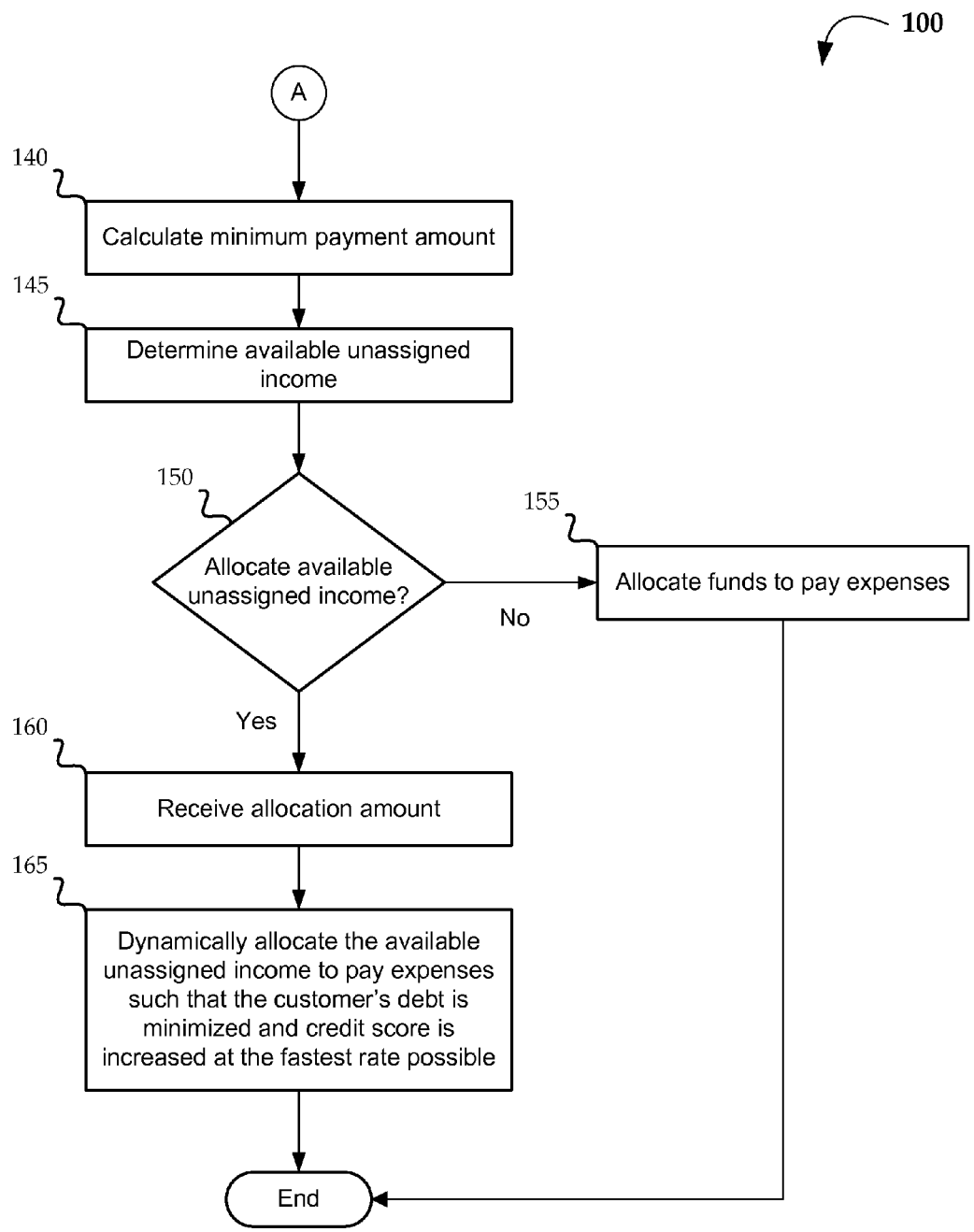
FIG. 1B is a flow diagram further illustrating a method for credit optimization and debt reduction according to embodiments of the present invention.

FIG. 1B which further illustrates method 100 continuing from point A. At process block 140, based on the received information regarding the customer's credit card accounts and expenses, a minimum payment amount may be calculated. This minimum payment amount may be the lowest amount the customer would be required to pay in order to keep all accounts in good standing. At process block 145, based on the payroll information and the minimum payment calculation, an available unassigned income amount may be determined. This available unassigned income is any excess that the customer may have to use to pay down debt and/or apply to a savings account.

At decision block 150, the customer may choose to allocate some or all of the available unallocated income, or none of the available unallocated income. At process block 155, if the customer decided not to allocate any of the available unallocated income to pay down debt, then the funds required to pay credit card minimums and expenses are allocated and the various services and/or creditors are paid.

Alternatively, if the customer decides to allocate the unallocated available income, then an allocation amount may be received (process block 160). In one embodiment, the customer's income may be $5000.00, expenses may be $3500.00, and credit card minimum payment may be $500.00. Hence, the available unallocated income would be $1000.00. The customer may then, for example, choose to allocate $500.00 of the $1000.00 to use to pay down existing debt.

At process block 165, the unassigned available income designated by the customer may be allocated in such a way as to reduce debt and increase the customer's credit score. The funds may be allocated to reduce debt in the fasted way possible. For example, the funds may be applied to certain credit accounts in a bi-monthly fashion in order to reduce the amount of interest accrued. Furthermore, higher interest accounts may be paid down while lower interest accounts may only have minimum payments made. Ultimately, based on an analysis of the customer's financial report and allocation decision of available unassigned funds, a determination may be made as to how to reduce the customer's debt as quickly as possible.

In addition, a determination may be made as to how to increase the customer's credit score as quickly as possible. For example, even after a credit account has been paid off, it may be determined that keeping that credit account open may be the best way to increase the customer's credit score. Alternatively, it may be determined that the customer's credit score may be most efficiently increased by consolidating a number of credit accounts into one single account, roll the credit accounts into a refinanced mortgage, etc. Consequently, based on the customer's current debt and/or credit situation, a dynamic determination is made to increase the customer's credit score which is tailored to meet the customer's specific situation.

In one embodiment, such a determination (e.g., the customer's PLUS score) may be calculated using information from the customer's credit report on the day it is calculated. The PLUS score may be based on multiple factors such as: payment history (i.e., information about the way the customer has paid their credit accounts in the past, including late payments, bankruptcies, etc). Credit accounts may also be a factor (e.g., the number of credit accounts that that customer has and the different types of those credit accounts: credit cards, auto loans, etc.). Credit usage may be an additional factor (e.g., the amount of credit the customer is utilizing, the amount of credit still available, etc.). The length of credit history (e.g., the number of months the customer's credit accounts have been on the customer's credit report), credit applications (e.g., the number of times the customer has applied for credit in the recent past), and bankruptcies (e.g., the presence and age of bankruptcy records (if any) on the customer's credit report) may each also be factors in determining the customer's PLUS score.

One example of how such a PLUS score may be determined is as follows. Assume that bank A is offering a credit line of $20,000 @ 9.99% fixed rate if the customer's income greater than $75,000 and the customer's credit score is greater than 700. Alternatively, bank A is offering a credit line of $30,000 @ 8.99% fixed rate if the customer's income is greater than $85,000 and the customer's credit score is greater than 700. Also assume that the customer has an income of $90,000 and a credit score of 734. Further, assume that the customer's revolving accounts are greater than 2, the customer's total balance is less than $30,000, and that average weighted annual percentage rate (APR) is greater than 8.99%. Accordingly, it is best for the customer to consolidate revolving accounts 1, 2, and 3 into new maximum credit line of $30,000, and close the existing revolving accounts 1, 2, and 3. This algorithm is merely an example and much more complex algorithms may be used. Such algorithms may have many additional variables and potential outcomes to consider when providing the solution.

Figure 2:
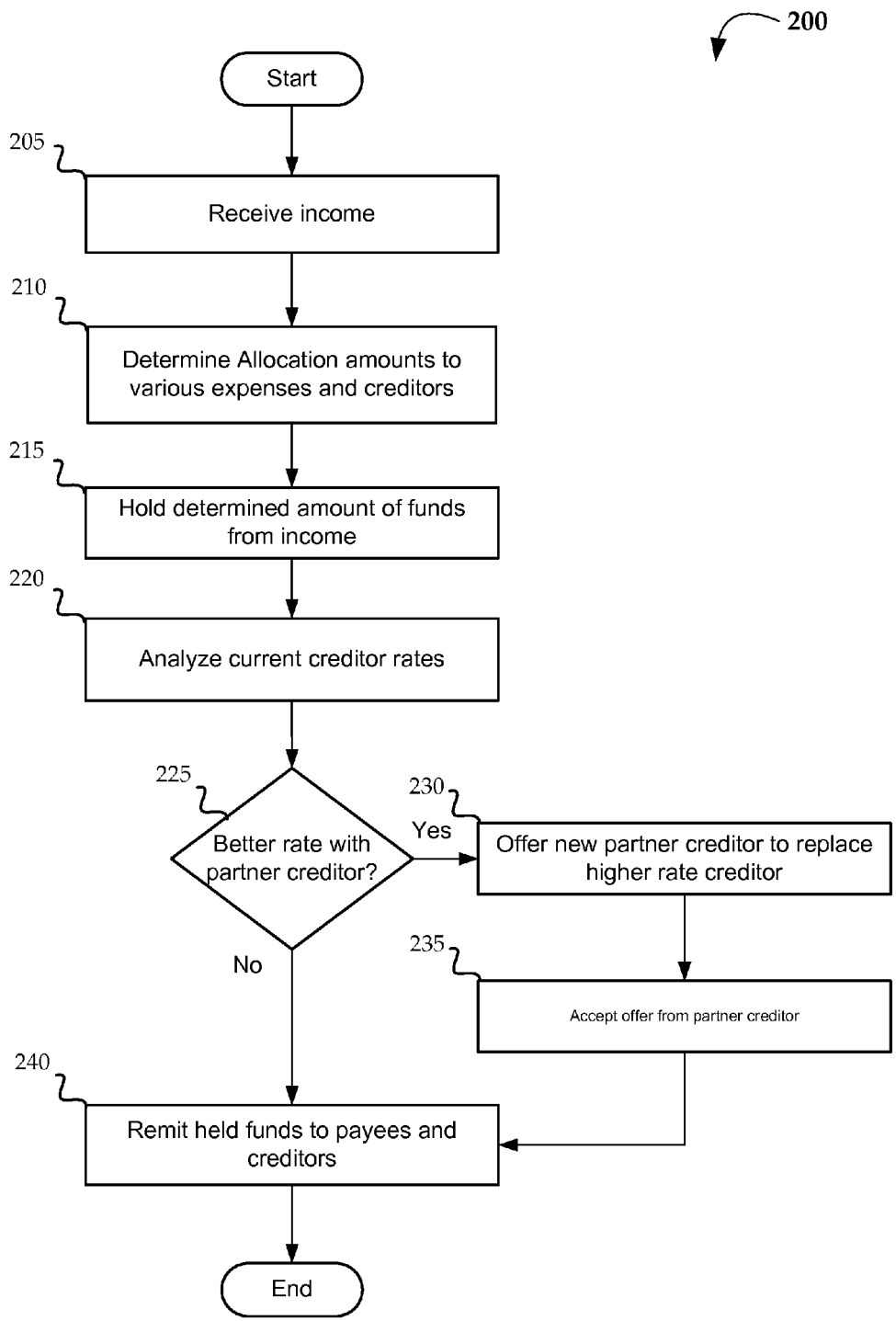
FIG. 2 is a flow diagram illustrating another embodiment of the present invention.

A method 200 for credit optimization and debt reduction is illustrated in FIG. 2. At process block 205, the customer's income funds may be received by a payment center (e.g., payment center 305 in FIG. 3). In one embodiment, these funds may be received via wire transfer, electronic funds transfer (EFT), etc. A determination may then be made as to the amounts needed to be allocated to the customer's expenses and/or creditors (process block 210).

At process block 215, the determined amount of funds may be held by the payment center. Subsequently, an analysis of the customer's current credit account rates may be preformed (process block 220). Specifically, determine the interest rates for the customer's current credit accounts and the type of interest (e.g., simple interest, compound interest, etc.) of the accounts. At decision block 225, a determination is made whether a partner of the payment center may be able to offer the customer a credit account with a better interest rate than the customer's current credit accounts.

In one embodiment, for example, a partner may be a credit card company, a mortgage company, an auto loan company, etc. In an alternative embodiment, the partner may not be in the credit business, but may be a utility company (e.g., cellular phone provider, home phone provider) with a plan that is less expensive than the customer's current utility plan. Nonetheless, the payment center, based on the partner's offers and the customer's current financial situation, may choose appropriate offers from the partners to present to the customer.

If it is determined that one or more partners have an offer with a better rate than the customer's current accounts, then the offer may be presented to the customer (process block 230). At process block 235, the customer may accept the partner's offer. As such, the customer may be required to fill out an application or other paperwork in order to receive the offer. Alternatively, the offer may be a pre-approved offer and the payment center and the partner may have an agreement which allows the customer to be automatically enrolled in the partner's plan.

At process block 240, based on the new credit and expense information, the funds held by the payment center may be remitted to pay the various creditors and/or expenses. Accordingly, the offers submitted to the customer from the partners will facilitate the payment center in reducing the customer's overall debt, as well as increasing the customer's credit score.

Figure 3:
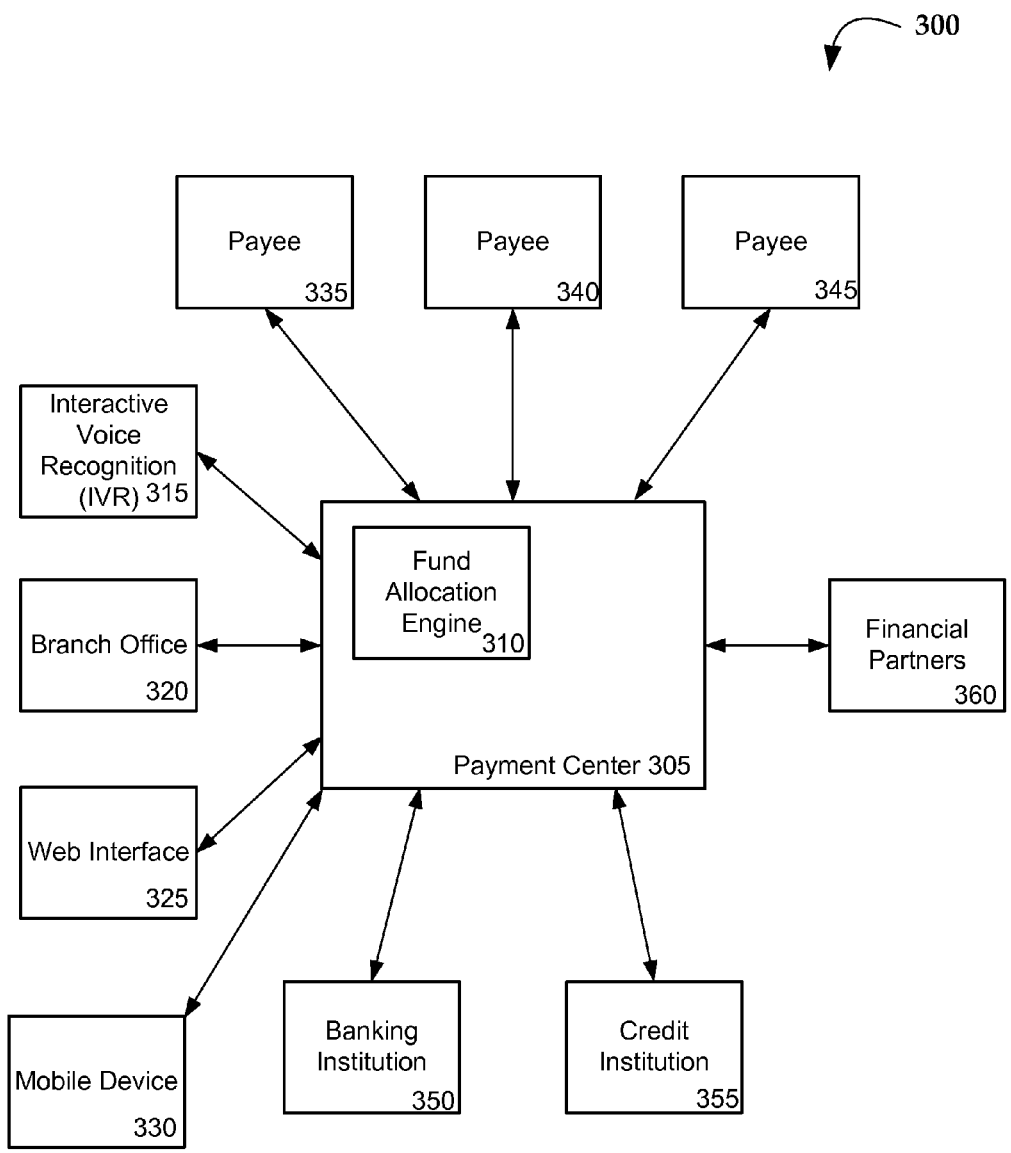
FIG. 3 is a block diagram illustrating a payment network according to embodiments of the present invention.

Turning now to FIG. 3, which illustrates a system 300 for credit optimization and debt reduction. In one embodiment, system 300 may include a payment center 305 which may include a fund allocation engine 310. System 300 may further include an interactive voice recognition (IVR) system 315, a branch office location 320, a web interface 325, and a mobile device 330 each coupled with payment center 305. In one embodiment, a customer may access payment center 305 via any one of IVR system 315, branch office location 320, web interface 325, and mobile device 330.

In one embodiment, the customer may be prompted to login to payment center 305 and input various personal and/or financial information. Such information may include name, address, phone number, birth date, social security number, banking account information, payroll information, etc. The customer may further input fixed and/or variable expense information which may be paid to, for example, payee 335, payee 340, or payee 345. Payment center 305 may receive such information and store it in an account for the customer.

In a further embodiment, system 300 may include a banking institution 350 (i.e., the corresponding bank based on the banking account information provided by the customer). In one embodiment, payment center 305 may request funds, account balance information, and other financial information from banking institution 350. Furthermore, system 300 may include a credit institution 355 (e.g., Experian™, Equifax™, TransUnion™, etc.) coupled with payment center 305. Payment center 305 may request the customer's credit report from credit institution 355.

In one embodiment, once payment center 305 receives all of the customer's entered expense, payroll, and credit information, and the customer's credit report, fund allocation engine 310 may generate a financial report for the customer. The customer may then review the report and determine if the report is accurate and/or complete. The customer may then make changes to their financial information via, for example, web interface 325. Based on any changes made, fund allocation engine 310 may then generate a revised financial report for the customer.

In a further embodiment, fund allocation engine 310 may determine how much available unallocated income the customer has to used to pay down debt and increase the customer's credit score. Based on the unallocated available funds, fund allocation engine 310 may determine the most efficient way in which to allocate the funds in order to reduce the customer's debt, as well as increase the customer's credit score.

A further embodiment of the present invention provides a bill paying system. The bill paying system may include a mechanism adapted to be coupled to a designated deposit account (DDA) belonging to a debtor. The DDA is periodically credited with a first credit on a first regular credit schedule. The mechanism is further coupled to a custody account adapted to receive funds from the DDA on a first funds transfer schedule, and coupled to a first creditor account belonging to a first creditor of the debtor. The mechanism is adapted for determining an amount of funds to be transferred from the custody account to the first creditor account to provide an accelerated repayment of a first debt owed the first creditor by the debtor.

Figure 4:
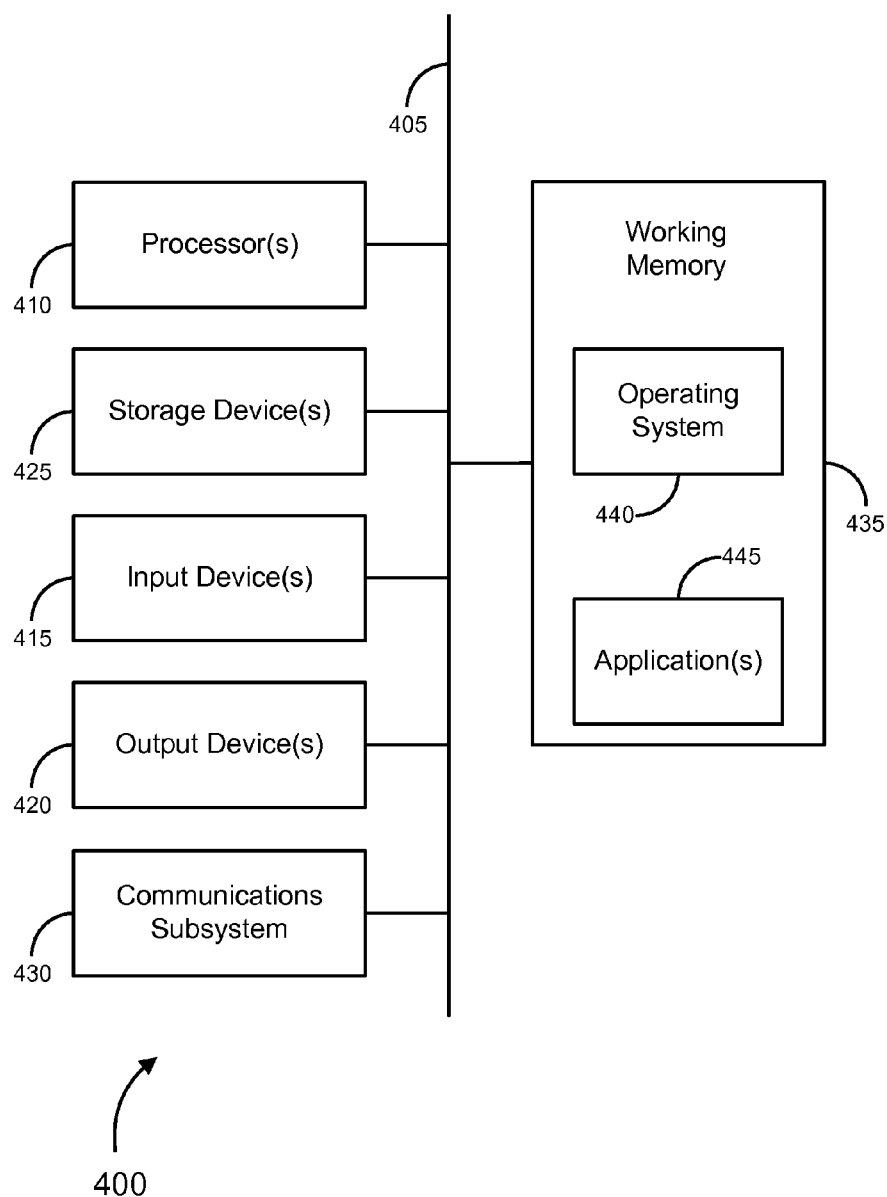
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as, for example, payment center 305 in FIG. 3. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
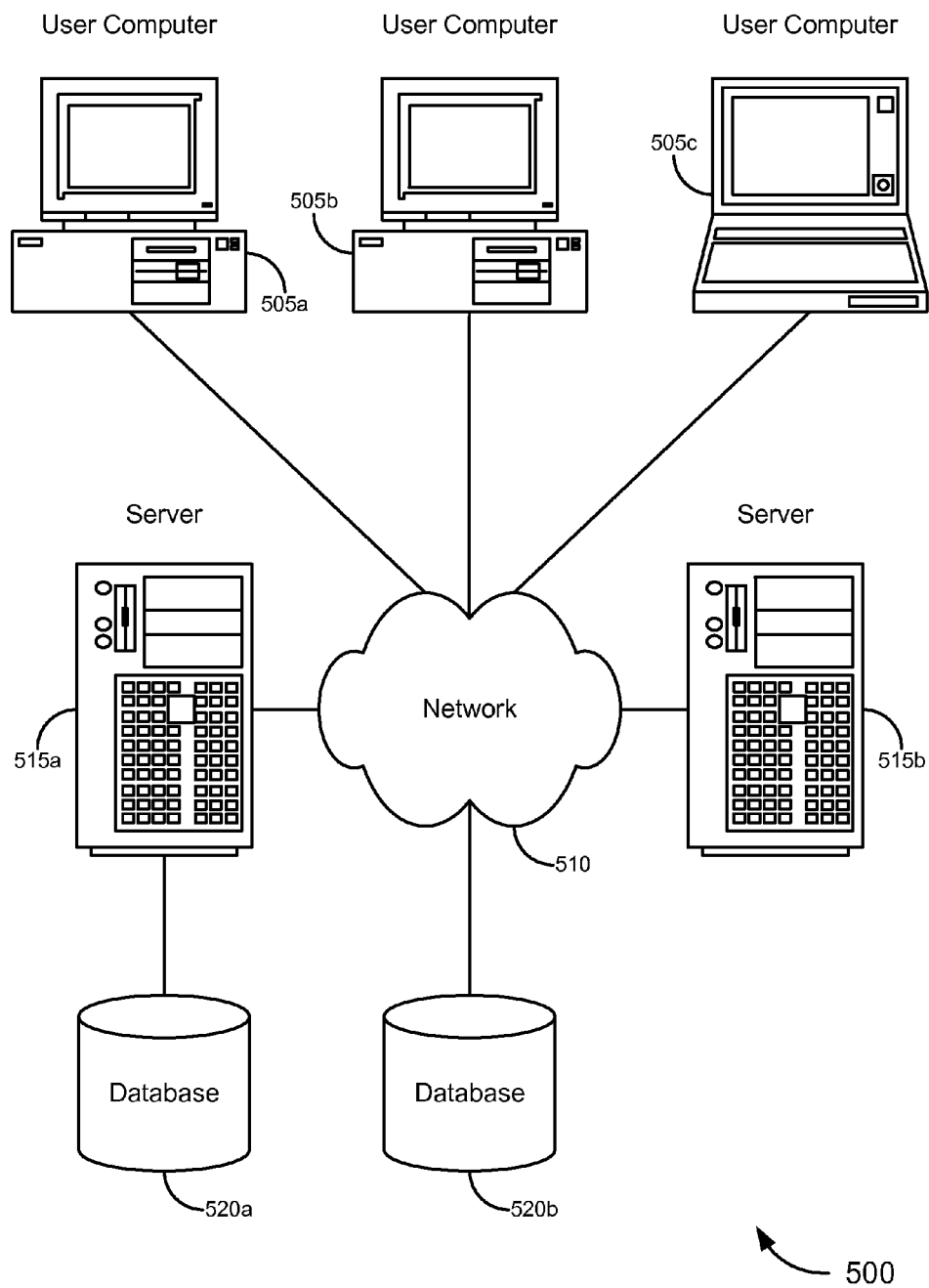
FIG. 5 is a block diagram illustrating a networked system of computers, which can be used in accordance with various embodiments of the invention.

A set of embodiments comprises systems for credit optimization and debt reduction. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as web interface 325 in FIG. 3. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as the database can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for reducing debt for a customer, the method comprising:
   receiving, at a computer system:
      a credit report;
      bank account information;
      payroll information; and
      expense information;
   generating, with the computer system, a financial report based at least in part on an aggregation of:
      the credit report;
      the bank account information;
      the payroll information; and
      the expense information;
   determining, with the computer system, available unassigned income based at least in part on the financial report; and
   allocating, with the computer system, the available unassigned income to pay the customer's expenses and one or more credit accounts such that the customer's debt is reduced, wherein the allocating of the available unassigned income is based at least in part on:
      an interest rate of at least one credit account;
      an interest type of at least one credit account; and
      a due date of at least one credit account.

2. The method for reducing debt for a customer as in claim 1, further comprising:
   sending the financial report to the customer;
   receiving, in response to the customer receiving the financial report, additional financial information from the customer; and
   incorporating the additional financial information into the financial report to create a revised financial report.

3. The method for reducing debt for a customer as in claim 2, wherein determining available unassigned income is further based at least in part on the revised financial report.

4. The method for reducing debt for a customer as in claim 1, further comprising:
offering the customer, based at least in part on the financial report, at least one of:
a debt consolidation offer;
a lower interest rate credit card offer;
a mortgage loan; or
an automobile loan.

5. The method for reducing debt for a customer as in claim 4, further comprising:
presenting the customer with a mechanism to accept the debt consolidation offer, the lower interest rate credit card offer, the mortgage loan, or the automobile loan; and
allocating funds according to the debt consolidation offer, the lower interest rate credit card offer, the mortgage loan, or the automobile loan, in response to the customer accepting.

6. The method for reducing debt for a customer as in claim 1, further comprising:
receiving from the customer via a user interface:
the bank account information;
the payroll information;
fixed expense information; and
variable expense information; and
determining the expense information based at least in part on the fixed expense information and the variable expense information.

7. The method for reducing debt for a customer as in claim 1, wherein the bank account information includes one or more of the following:
an account type;
an issuer; and
a balance.

8. The method for reducing debt for a customer as in claim 1, wherein the payroll information includes one or more of the following:
an amount; and
a frequency.

9. The method for reducing debt for a customer as in claim 1, wherein:
expense information comprises fixed expense information and variable expense information, and the fixed expense information includes one or more of the following:
automobile payments;
insurance payments;
student loan payments;
mortgage payments; and
other fixed or variable loans.

10. The method for reducing debt for a customer as in claim 1, wherein:
expense information comprises fixed expense information and variable expense information, and the variable expense information includes one or more of the following:
utility expenses;
groceries expenses;
entertainment expenses; and
other variable payment lines of credit.

11. The method for reducing debt for a customer as in claim 1, wherein the interest type includes one of the following:
a simple interest rate; and
a compound interest rate.

12. A system for reducing debt for at least one customer, the system comprising:
a payment center processor, wherein:
the payment center processor is in communication with:
at least one payee;
at least one credit institution;
at least one bank;
the payment center processor is configured to:
receive at least one bill for the at least one customer from the at least one payee;
receive at least one credit report from the credit institution, wherein the credit report includes:
an account identifier;
a balance;
an interest rate; and
an interest type;
receive pay information from the bank;
generate a financial report based at least in part on an aggregation of:
the at least one bill;
the at least one credit report; and
the pay information;
determining, with the computer system, available unassigned income based at least in part on the financial report;
and
allocating, with the computer system, the available unassigned income to pay the at least one bill.

13. The system for reducing debt for at least one customer as in claim 12, wherein the payment center processor is further configured to:
determine, based at least in part on the interest rate or the financial report, to offer the customer:
a debt consolidation offer;
a lower interest rate credit card offer;
a mortgage loan; or
an automobile loan.

14. The system for reducing debt for at least one customer as in claim 12, wherein the payment center processor is further configured to:
cause the at least one bill to be paid, based at least in part on the financial report.

15. The system for reducing debt for at least one customer as in claim 12, wherein the payment center processor is further configured to:
send the financial report to the at least one customer;
receiving, in response to the at least one customer receiving the financial report, additional financial information from the at least one customer; and
incorporating the additional financial information into the financial report to create a revised financial report.

16. The system for reducing debt for at least one customer as in claim 15, wherein determining available unassigned income is further based at least in part on the revised financial report.

17. A non-transitory machine readable medium having a set of instructions stored thereon for reducing debt of a customer which, when executed by a machine, cause the machine to:
receive a credit report, bank account information, payroll information, and expense information;
generate a financial report based at least in part on an aggregation of the credit report, the bank account information, the payroll information, and the expense information;
determine available unassigned income based at least in part on the financial report; and allocate the available unassigned income to pay the customer's expenses and one or more credit accounts such that the customer's debt is reduced, wherein the allocating of the available unassigned income is based at least in part on:
an interest rate of at least one credit account;
an interest type of at least one credit account; and
a due date of at least one credit account.

18. The non-transitory machine readable medium as in claim 17, wherein the set of instructions, when executed by the machine, further cause the machine to:
hold funds based on the determined the available unassigned income; and
remit the held funds to pay the one or more of the credit accounts and the customer's expenses.

19. The non-transitory machine readable medium as in claim 17, wherein the set of instructions, when executed by the machine, further cause the machine to:
provide to the customer, based at least in part on the financial report:
a debt consolidation offer;
a lower interest rate credit card offer;
a mortgage loan; or
an automobile loan.

20. The non-transitory machine readable medium as in claim 19, wherein the sets of instructions when further executed by the machine, cause the machine to:
presenting the customer with a mechanism to accept the debt consolidation offer, the lower interest rate credit card offer, the mortgage loan, or the automobile loan; and
allocating funds according to the debt consolidation offer, the lower interest rate credit card offer, the mortgage loan, or the automobile loan, in response to the customer accepting.

* * * * *